United States Patent [19]

Maas et al.

[11] Patent Number: 5,256,237
[45] Date of Patent: Oct. 26, 1993

[54] INNER SURFACE FIBER AFFIXATION FOR MANUFACTURING A SENSOR MANDREL

[75] Inventors: Steven J. Maas, Simi Valley; Michael R. Layton, Clayton; A. Douglas Meyer, Canoga Park; Dennis P. Bevan, Alhambra, all of Calif.

[73] Assignee: Litton Systems, Inc., Woodland Hills, Calif.

[21] Appl. No.: 762,737

[22] Filed: Sep. 17, 1991

Related U.S. Application Data

[62] Division of Ser. No. 512,853, Apr. 23, 1990, abandoned.

[51] Int. Cl.⁵ .................. H04R 31/00; B32B 31/04; B32B 31/14
[52] U.S. Cl. ................ 156/293; 156/156; 156/173; 156/175; 156/194; 156/294; 156/425; 367/141; 367/149; 385/13
[58] Field of Search ........... 156/144, 156, 173, 175, 156/189, 194, 293, 294, 425, 446, 432, 429, 450, 172; 264/314, 258; 367/141, 149; 250/227.17; 385/128, 13

[56] References Cited

U.S. PATENT DOCUMENTS

| 570,165 | 10/1896 | Greenfield . |
| 2,967,796 | 1/1961 | Raffel . |
| 3,033,730 | 5/1962 | Martin . |
| 3,156,598 | 11/1964 | Martin . |
| 3,579,400 | 5/1967 | Kanyok et al. . |
| 3,694,291 | 9/1972 | McAllister . |
| 3,902,944 | 9/1975 | Ashton et al. . |
| 3,962,506 | 6/1976 | Dunahoo . |
| 3,986,383 | 10/1976 | Petteys . |
| 4,048,713 | 9/1977 | Hvass . |
| 4,126,659 | 11/1978 | Blad . |
| 4,144,632 | 3/1979 | Stroupe . |
| 4,146,302 | 3/1979 | Jachimowicz . |
| 4,405,198 | 9/1983 | Taylor . |
| 4,525,818 | 6/1985 | Cielo et al. . |
| 4,527,749 | 7/1985 | Matthews et al. ............ 242/156 X |
| 4,568,408 | 2/1986 | Schmadel et al. . |
| 4,616,392 | 10/1986 | Snyder . |
| 4,685,662 | 8/1987 | Vaughn . |

FOREIGN PATENT DOCUMENTS

| 290798 | 11/1988 | European Pat. Off. ............ 156/173 |
| 3502603 | 7/1986 | Fed. Rep. of Germany ....... 156/293 |
| 225954 | 8/1985 | German Democratic Rep. ............................. 156/293 |

*Primary Examiner*—Jeff H. Aftergut

[57] ABSTRACT

The inner surface affixation system and process is a method for affixing wound optical fibers on the inner surface of a hollow cylinder. It is useful, for example, in the manufacture of rigid mandrel-based fiber optic sensors. The optical fibers of a sensor wound on the inner surface are less susceptible to damage than are optical fibers wound on the outside of the mandrel.

The process requires that the fibers be supported on a cylinder, which is coated with an adhesive and placed within the sensor mandrel cylinder, at which time the circumference of the supporting cylinder is expanded, causing the fibers to engage the inner surface of the sensor mandrel cylinder. The adhesive is then cured, holding the fibers in place on the inner surface of the sensor mandrel cylinder while the supporting cylinder is contracted and removed from the sensor mandrel cylinder.

12 Claims, 4 Drawing Sheets

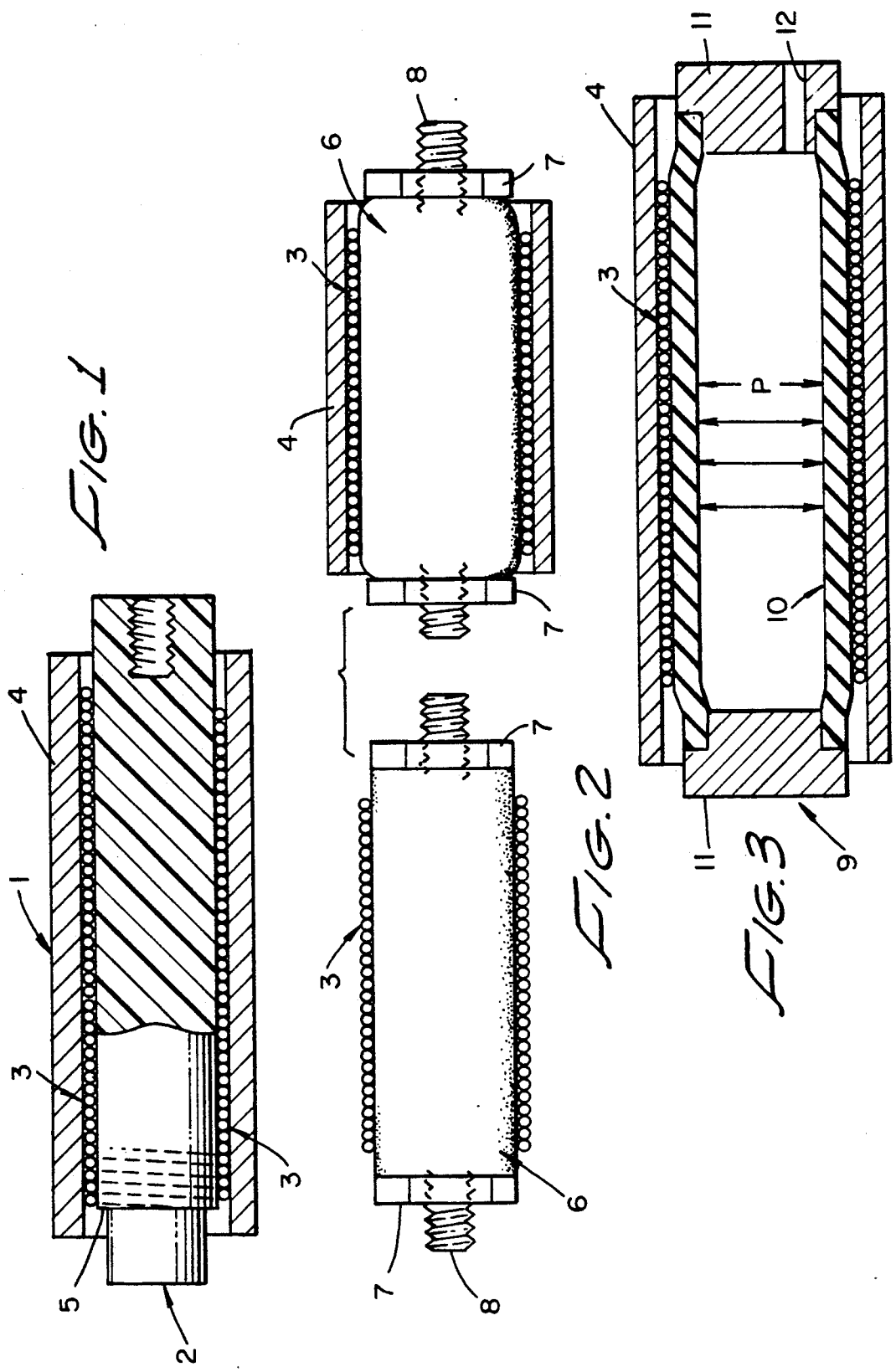

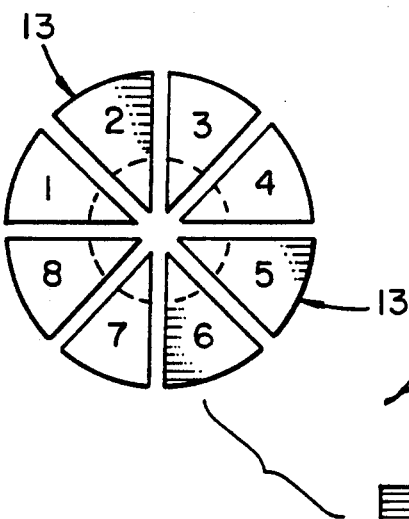
FIG. 4
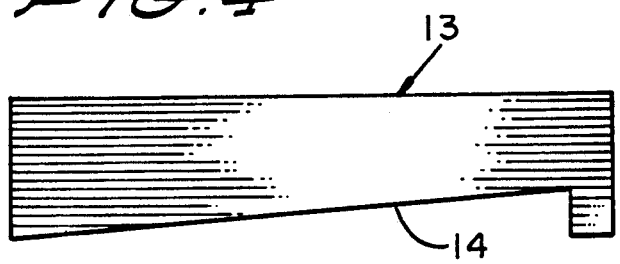
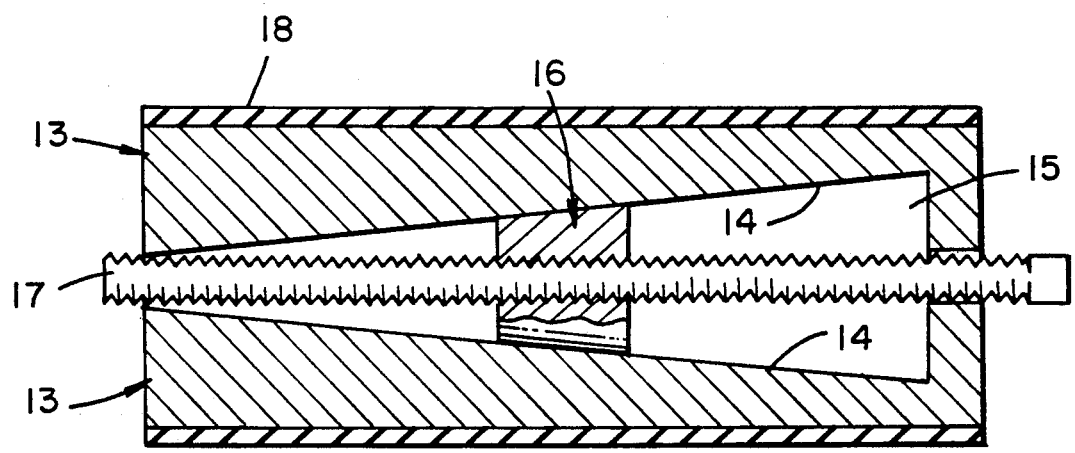
FIG. 5
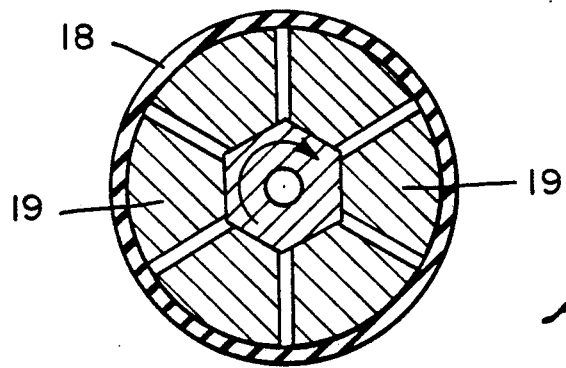
FIG. 6

INNER SURFACE FIBER AFFIXATION FOR MANUFACTURING A SENSOR MANDREL

This application is a division of U.S. patent application Ser. No. 07/512,853 filed on Apr. 23, 1990 now abandoned, in the name of Steven J. Maas. Michael R. Layton, A. Douglas Meyer and Dennis P. Bevan entitled "INNER SURFACE FIBER AFFIXATION SYSTEM AND PROCESS".

BACKGROUND OF THE INVENTION

1. Field of the Invention

The invention relates to an inner surface fiber affixation system and to a process for producing fiber optic hydrophone sensor mandrels.

2. Description of Related Art

Previously, fiber optic hydrophone sensors have been assembled by affixing the optical fibers to the external surface of a rigid mandrel. The disadvantage to having the fiber wound on the outside of the mandrel is that the fiber is exposed to the environment and may be susceptible to damage.

SUMMARY OF THE INVENTION

This invention relates to a system for affixing wound optical fibers to the inner surface of a hollow member. This system includes means for supporting the fibers in a desired arrangement and transferring the fibers from the supporting means to a desired location on the inner surface of the hollow member, and means for securing the fibers to the desired location. In preferred embodiments, the system affixes optical fibers to the inner surface of a hollow, cylindrical member to produce the sensing mandrels of a fiber optic hydrophone. However, the system can be used for other applications which require fibers to be affixed to the inner surface of a hollow member.

In preferred embodiments, the supporting means consists of a cylindrical form upon which the fibers are wound. An adhesive coating is placed on the wound fibers and on the inner surface of the hollow, cylindrical member. The cylindrical form, with the fibers in the desired arrangement, is then placed inside the hollow, cylindrical member.

Transferring the fibers from the supporting form to the hollow member is accomplished by expanding the circumference of the supporting form, or contracting the circumference of the hollow member, sufficiently to cause the fibers to engage the inner surface of the hollow member.

In one preferred embodiment, a teflon mandrel is used as the cylindrical form. Heating the teflon mandrel provides sufficient radial expansion to cause the fibers to engage the inner surface of the hollow, cylindrical member. Once the adhesive has cured, cooling the teflon mandrel causes it to contract, facilitating removal.

Other methods of expanding and contracting the circumference of the cylindrical form also provide satisfactory results. An expandable cylinder may be employed as the cylindrical form where applying axial pressure toward the center would result in radial expansion of the cylinder. Releasing the axial pressure would allow contraction.

Alternatively, a cylindrical bladder may be used. Expansion of the cylindrical bladder is accomplished by increasing the internal pressure of the bladder, resulting in radial expansion and an increase in the overall circumference of the bladder. Contraction would then be accomplished by decreasing the internal pressure of the cylindrical bladder. In preferred embodiments, a thin-walled rubber or synthetic hose, or thin teflon tube serves as the cylindrical bladder. However, any material which could be radially expanded by the application of reasonable pressures may be used.

A solid cylinder divided longitudinally into four, six, or eight identical sections could also be used. In preferred embodiments, a thin rubber sleeve is used to hold the various sections in a cylindrical shape. However, other types of elastic materials would be equally suitable. By applying an outward radial force to each of the sections, the circumference may be increased as desired. Removing the force would allow contraction of the circumference.

In another embodiment, the cylindrical form defines a bore running longitudinally along the center of the cylindrical form. Thermally conductive elements are placed within the bore as a means for heating and cooling the cylindrical form. As before, optical fibers are wound in the desired arrangement on the cylindrical form and placed inside the hollow, cylindrical member. Heat is applied to the cylindrical form, via the thermally conductive elements in the central bore, causing the cylindrical form to expand radially. Thus, the optical fibers wound on the cylindrical form engage the inner surface of the hollow, cylindrical member. After the adhesive has cured, the cylindrical form is cooled to facilitate its removal, leaving the optical fibers affixed to the inner surface of the hollow, cylindrical member.

The previously discussed preferred embodiments each require the expansion of the cylindrical form to effect the engagement of the fibers to the inner surface of the hollow, cylindrical member. However, another preferred embodiment involves the contraction of the circumference of the hollow, cylindrical member sufficiently to engage the fibers to the inner surface of the hollow, cylindrical member.

In such a preferred embodiment, contracting the circumference of the hollow, cylindrical member is accomplished by cooling the hollow, cylindrical member, causing it to contract and engage the fibers positioned on the cylindrical form. Once the adhesive has cured, the hollow, cylindrical member is heated sufficiently causing its expansion. With the fibers now affixed to the inner surface of the hollow, cylindrical member, the cylindrical form is easily removed.

BRIEF DESCRIPTION OF THE DRAWINGS

FIG. 1 is a linear cross-sectional view of a preferred embodiment of an inner surface fiber affixation system showing the various components;

FIG. 2 shows a side view illustrating a preferred embodiment using an expandable cylinder;

FIG. 3 shows a linear cross-sectional view of a preferred embodiment using a cylindrical bladder;

FIG. 4 shows a radial and linear view illustrating the sections of a preferred embodiment using a moving wedge;

FIG. 5 is a linear cross-sectional view of a preferred embodiment using a moving wedge;

FIG. 6 is a radial cross-sectional view of a preferred embodiment using a rotating eccentric hub;

DESCRIPTION OF THE PREFERRED EMBODIMENT

Figure 7:
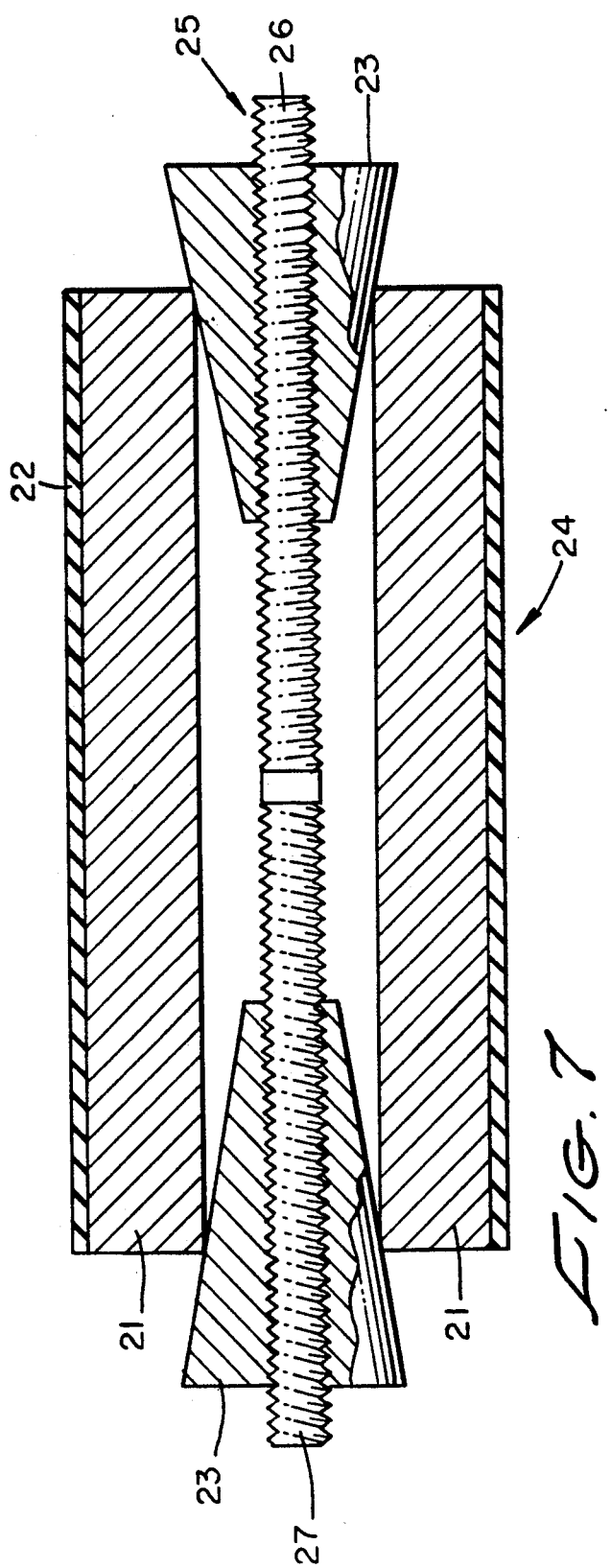
FIG. 7 shows a linear cross-sectional view of a preferred embodiment using two cone shaped wedges.

FIG. 1 is a linear cross-sectional view of a preferred embodiment of an inner surface fiber affixation system 1. The system includes teflon mandrel 2, which serves as the supporting means upon which optical fibers 3 are wound in the desired arrangement, and coated with an adhesive. The mandrel/fiber assembly is then placed into hollow member 4 in the desired position. The mandrel/fiber assembly is heated, causing mandrel 2 to expand and fibers 3 to engage hollow member 4. After the adhesive has cured, the assembly is cooled, causing mandrel 2 to contract and disengage from the fibers 3. As mandrel 2 contracts sufficiently, it is then easily removed from hollow member 4. A step is made in mandrel 2 to avoid damage to the fibers during removal. Removal of mandrel 2 is from the same side as insertion, but in the opposite sense.

FIG. 2 shows two side views illustrating a preferred embodiment using an expandable cylinder 6. The expandable cylinder 6 serves as supporting means for optical fibers 3. End caps 7 are placed on threaded rod 8. After the cylinder/fiber assembly is placed in hollow member 4, end caps 7 are rotated to exert sufficient axial pressure on expandable cylinder 6. The resulting radial expansion causes fibers 3 to engage the inner surface of hollow member 4. Removal of expandable cylinder 6 is accomplished by rotating end caps 7 to relieve the axial pressure, thus reducing the circumference of expandable cylinder 6.

FIG. 3 shows a linear cross-sectional view of a preferred embodiment using a cylindrical bladder 9. Cylindrical bladder 9 serves as supporting means for optical fibers 3. The cylindrical bladder consists of thin-walled hose 10, pressure plugs at each end 11, and a pressure vent 12. After the cylinder/fiber assembly is placed in hollow member 4, the internal pressure is increased causing expansion of the circumference of cylindrical bladder 9. Fibers 3 engage the inner surface of hollow member 4. Once the adhesive has cured, decreasing the internal pressure will allow removal of cylindrical bladder 9.

FIGS. 4 and 5 show a preferred embodiment where a solid cylinder is divided longitudinally into a number of identical sections 13, in this case, eight. The center-facing edge of each section 14 is then longitudinally tapered to provide tapered channel 15 when the segments are reassembled. Wedge 16 is placed in tapered channel 15, on threaded rod 17 running longitudinally through the cylinder. Sections 13 are held together in cylindrical form by elastic sleeve 18. Expansion is caused by rotating threaded rod 17, causing moving wedge 16 to move along the length of threaded rod 17 in tapered channel 15. Contracting is accomplished by reversing the rotation of threaded rod 17, causing moving wedge 16 to retrace its travel in the tapered channel.

FIG. 6 shows a preferred embodiment where a solid cylinder is divided longitudinally into a number of identical sections 19, in this case, six. Sections 19 are held together in cylindrical form by elastic sleeve 18. Expansion of the circumference is accomplished by rotating eccentric hub 20, running longitudinally through the center of the cylinder assembly, 30° in either direction. Contraction requires an additional 30° rotation in either direction.

FIG. 7 shows a preferred embodiment where a hollow cylinder is divided longitudinally into a number of identical sections 21, in this case, six. Sections 21 are held together in cylindrical form by elastic sleeve 22. Two cone-shaped wedges 23 are inserted into the channel running longitudinally along cylindrical form 24. Through each of the cone-shaped wedges 23 runs threaded rod 25, having a first end containing right-hand threads 26 and a second end containing left-hand threads 27. The cones are indexed to one of the segments to prevent their free rotation. Rotating threaded rod 25 causes cone-shaped wedges 23 to move together axially toward the center or away from the center of cylindrical form 24, depending upon the direction of rotation of threaded rod 25. Expansion of the circumference results from cone-shaped wedges 23 being forced further into the channel running longitudinally along cylindrical form 24, causing a radial force outward on each of sections 21. Contraction is accomplished by reversing the rotation of threaded rod 25, causing cone-shaped wedges 23 to move axially away from the center of cylindrical form 24, thus reducing the outward radial force.

Figure 8:
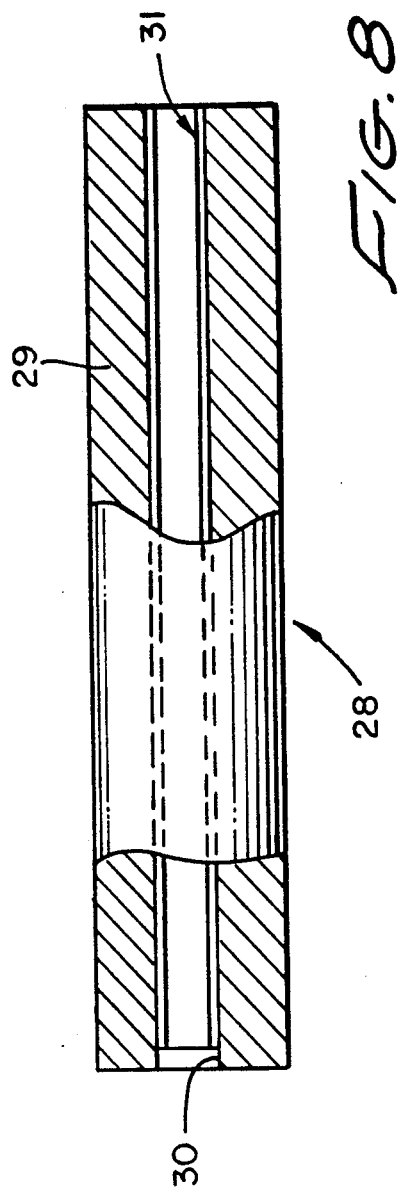
FIG. 8 shows a linear cross-sectional view of a the supporting means in a preferred embodiment using thermally conductive elements.

FIG. 8 shows a linear cross-sectional view of the supporting means in a preferred embodiment using thermally active elements 28. The supporting means, cylindrical form 29, defines a central bore 30 running longitudinally. In this bore are placed thermal elements 31 which heat cylindrical form 29, causing radial expansion of cylindrical form 29. Thermally active elements 28 may be used to cool, causing cylindrical form 29 to contract, thus facilitating its removal.

This embodiment is an alternative to the embodiment illustrated in FIG. 1. There, the mandrel/fiber assembly is heated, causing mandrel 2 to expand and fibers 3 to engage hollow member 4. Here, hollow member 35 is cooled, causing it to contract and engage fibers 34.

Figure 9:
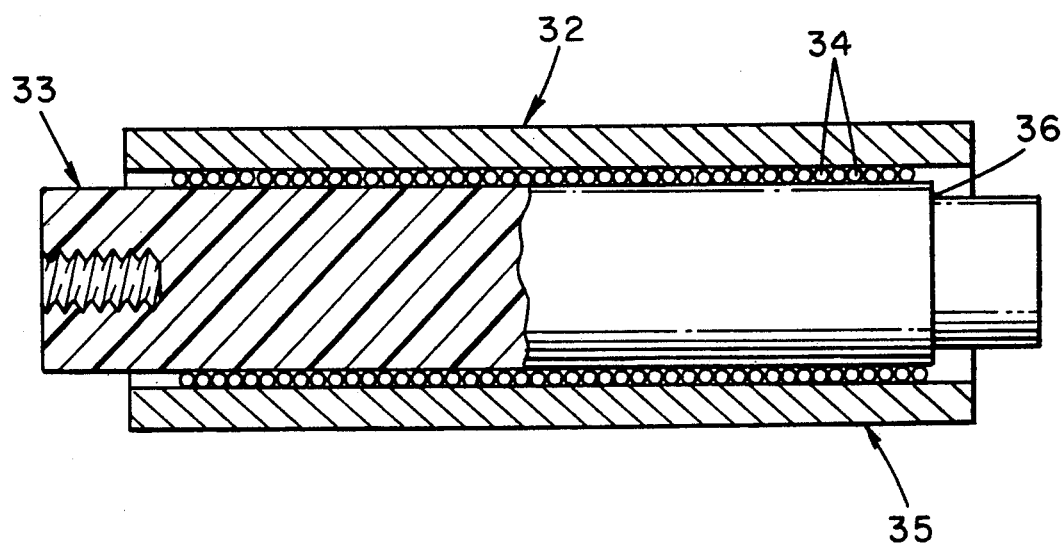
FIG. 9 is a linear cross-sectional view of a preferred embodiment of an inner surface fiber affixation system in which the hollow member contracts.

FIG. 9 is a linear cross-sectional view of another preferred embodiment of an inner surface fiber affixation system 32.

The system includes supporting means 33 upon which optical fibers 34 are wound in the desired arrangement. The supporting means/fiber assembly is then placed into hollow member 35, in the desired position. Hollow member 35 is then cooled, causing sufficient contraction for the inner surface of hollow member 35 to engage fibers 34. After the adhesive has cured, hollow member 35 is heated sufficiently, causing its expansion. With fibers 34 now affixed to the inner surface of the hollow member, supporting means 33 is easily removed. A step 36 is made in supporting means 33 to avoid damage to fibers 34 during removal.

In these embodiments, then, in general the fiber is coated with an adhesive prior to being placed in the hollow member. The fiber is then brought into contact with the inner wall of the hollow member by either expanding the cylindrical form or contracting the hollow member. The adhesive is then allowed to cure, at which time the cylindrical form is removed.

While preferred embodiments of the present invention have been described and illustrated, various modifications will be apparent to those skilled in the art and it is intended to include all such modifications and variations within the scope of the appended claims.

What is claimed is:

1. A method for producing a sensor mandrel by affixing optical fibers to an inner surface of a hollow, cylindrical member comprising the steps of:
   supporting said optical fibers in a desired arrangement on a cylindrical form;
   positioning the cylindrical form and said optical fibers in a desired position within the hollow, cylindrical member;
   expanding the circumference of said cylindrical form sufficiently to cause said optical fibers to engage said inner surface of said hollow, cylindrical member in said desired arrangement;
   contracting the circumference of said cylindrical form sufficiently to cause said optical fibers to disengage from said cylindrical form;
   securing said optical fibers to said inner surface at said desired position; and
   removing said cylindrical form from sad hollow, cylindrical member.

2. The method of claim 1, comprising the steps of:
   fashioning said cylindrical form from a material that will expand sufficiently when heated;
   wherein the step of expanding comprises heating the cylindrical form to cause sufficient radial expansion of the cylindrical form; and
   the step of contracting comprises cooling the cylindrical form to cause sufficient radial contraction of the cylindrical form.

3. The method of claim 1, comprising the steps of:
   fashioning said cylindrical form from a mechanically expandable cylinder that will expand sufficiently when axial pressure is exerted on said cylinder;
   wherein the step of expanding comprises exerting axial pressure on each end of the cylinder to cause sufficient radial expansion of the cylinder; and
   the step of contracting comprises removing the axial pressure from the cylinder to cause sufficient radial contraction of the cylindrical form.

4. The method of claim 1, comprising the steps of:
   fashioning said cylindrical form from a pressure expandable cylindrical bladder;
   wherein the step of expanding comprises increasing the pressure within said cylindrical bladder to cause sufficient radial expansion of the cylindrical bladder to cause said optical fibers to engage said inner surface of said hollow, cylindrical member; and
   the step of contracting comprises decreasing the pressure within said cylindrical bladder to cause sufficient radial contraction of the cylindrical bladder.

5. The method of claim 1, comprising the steps of:
   fashioning said cylindrical form from a solid cylinder;
   dividing said cylinder into a plurality of identical, longitudinal segments;
   assembling said segments into a cylindrical array;
   wherein the step of expanding comprises exerting radial pressure from the center of said cylindrical array outward to cause sufficient radial expansion of the cylindrical array; and
   the step of contracting comprises removing said radial pressure from the cylindrical array to cause sufficient radial contraction of the cylindrical array.

6. The method of claim 5 in which exerting said radial pressure comprises driving a moving wedge axially toward a narrow end along a tapered channel defined by said cylindrical array.

7. The method of claim 6 in which removing said radial pressure comprises reversing the travel of said moving wedge axially away from the narrow end of said tapered channel.

8. The method of claim 5 in which exerting said radial pressure comprises sufficiently rotating a multi-faced, eccentric hub within a matching axial bore running longitudinally through said cylindrical array.

9. The method of claim 8 in which removing said radial pressure comprises rotating said eccentric hub an additional amount such that said hub will be aligned with said axial bore.

10. The method of claim 5 in which exerting said radial pressure comprises driving two cone-shaped wedges positioned at each end of the array axially toward a center of said array.

11. The method of claim 10 in which removing said radial pressure comprises reversing travel of said cone-shaped wedges axially away from the center of the array.

12. The method of claim 1 wherein the optical fibers affixed to the inner surface of the hollow, cylindrical member form a hydrophone sensor mandrel.

* * * * *